US012632539B2

(12) United States Patent
Liu

(10) Patent No.: US 12,632,539 B2
(45) Date of Patent: May 19, 2026

(54) CONTROL INSTRUCTION PROCESSING METHOD, APPARATUS AND DEVICE, AND COMPUTER STORAGE MEDIUM

(71) Applicant: GUANGDONG INSPUR SMART COMPUTING TECHNOLOGY CO., LTD., Guangzhou (CN)

(72) Inventor: Tao Liu, Guangzhou (CN)

(73) Assignee: GUANGDONG INSPUR SMART COMPUTING TECHNOLOGY CO., LTD., Guangzhou (CN)

( * ) Notice: Subject to any disclaimer, the term of this patent is extended or adjusted under 35 U.S.C. 154(b) by 705 days.

(21) Appl. No.: 17/928,164

(22) PCT Filed: Feb. 19, 2021

(86) PCT No.: PCT/CN2021/076922
§ 371 (c)(1),
(2) Date: Nov. 28, 2022

(87) PCT Pub. No.: WO2021/258750
PCT Pub. Date: Dec. 30, 2021

(65) Prior Publication Data
US 2023/0205870 A1 Jun. 29, 2023

(30) Foreign Application Priority Data
Jun. 24, 2020 (CN) .......................... 202010589326.8

(51) Int. Cl.
*G06F 21/54* (2013.01)
*G06F 9/48* (2006.01)
(Continued)

(52) U.S. Cl.
CPC ............ *G06F 21/54* (2013.01); *G06F 9/4881* (2013.01); *G06F 9/546* (2013.01); *G06F 21/554* (2013.01);
(Continued)

(58) Field of Classification Search
CPC ........ G06F 21/54; G06F 9/4881; G06F 9/546; G06F 21/554; G06F 2209/548; G06F 2209/549
See application file for complete search history.

(56) References Cited

U.S. PATENT DOCUMENTS 8,924,981 B1 * 12/2014 Brown .............. G06F 16/24532
709/225
11,023,167 B2 * 6/2021 D'Eliseo ............... G06F 3/0611
(Continued)

FOREIGN PATENT DOCUMENTS

CN          103973502 A      8/2014
CN          104679596 A      6/2015
(Continued)

OTHER PUBLICATIONS

Translation of Foreign Patent Document WO-2016197693-A1 (Year: 2016).*
(Continued)

*Primary Examiner* — Kevin L Young
*Assistant Examiner* — Jennifer Marie Gutman
(74) *Attorney, Agent, or Firm* — IPro, PLLC

(57) ABSTRACT

A control instruction processing method, apparatus and a device, and a computer storage medium. The method is applied to a first control system. The method includes: receiving a target control instruction on the basis of a control instruction receiving thread, the target control instruction including a control instruction sent by a second control system that controls the first control system (S101); determining whether the target control instruction is legitimate (S102); if the target control instruction is legitimate, storing the target control instruction in a pre-set queue, and sending, to the second control system, information which represents the fact that the target control instruction has been received, such that the second control system ends the sending of the
(Continued)

Receiving a target control instruction according to a control instruction receiving thread, wherein the target control instruction includes a control instruction sent by a second control system that controls the first control system —— S101

Determining whether the target control instruction is legal —— S102
No
Yes

Storing the target control instruction in a preset queue, and sending a message indicating that the target control instruction is received to the second control system, so that the second control system stops sending the target control instruction —— S103

Processing the control instruction in the preset queue according to a control instruction processing thread —— S104

Sending a message indicating that the target control instruction is illegal to the second control system —— S105 target control instruction (S103); and processing the control instruction in the pre-set queue on the basis of a control instruction processing thread (S104).

14 Claims, 2 Drawing Sheets

(51) Int. Cl.
*G06F 9/54* (2006.01)
*G06F 21/55* (2013.01)
(52) U.S. Cl.
CPC .. *G06F 2209/548* (2013.01); *G06F 2209/549* (2013.01)

(56) References Cited

U.S. PATENT DOCUMENTS

| | | | | |
|---|---|---|---|---|
| 2006/0161920 A1* | 7/2006 | An | | G06F 9/485 |
| | | | | 718/102 |
| 2008/0263288 A1* | 10/2008 | Austen | | G06F 11/0715 |
| | | | | 711/153 |
| 2009/0271789 A1 | 10/2009 | Babich | | |
| 2010/0127880 A1* | 5/2010 | Schechter | | G01K 1/024 |
| | | | | 340/584 |
| 2011/0161961 A1* | 6/2011 | Fu | | G06F 9/5027 |
| | | | | 718/102 |
| 2012/0278819 A1* | 11/2012 | Cho | | G06F 13/385 |
| | | | | 719/325 |
| 2015/0215283 A1* | 7/2015 | Fischer | | H04L 63/0263 |
| | | | | 726/14 |
| 2019/0034097 A1* | 1/2019 | Chang | | G06F 3/0653 |
| 2019/0190842 A1* | 6/2019 | Buban | | H04L 47/564 |
| 2020/0065140 A1* | 2/2020 | Wu | | G06F 9/4881 |
| 2020/0278872 A1* | 9/2020 | Shigematsu | | G06F 9/546 |
| 2021/0248018 A1* | 8/2021 | Iyer | | G06F 9/541 |

FOREIGN PATENT DOCUMENTS

| | | | |
|---|---|---|---|
| CN | 105634984 A | 6/2016 | |
| CN | 107370667 A | 11/2017 | |
| CN | 108647104 A | 10/2018 | |
| CN | 110187985 A | 8/2019 | |
| CN | 111737030 A | 10/2020 | |
| JP | 2004030312 A | 1/2004 | |
| WO | WO-2016197693 A1 * | 12/2016 | ............. G06F 13/42 |

OTHER PUBLICATIONS

"Thread (Computing)", Wikipedia, May 1, 2020, pp. 1-9 (Year: 2020).*

English Translation of Foreign Patent Document WO-2016197693-A1 (Year: 2016).*

PCT/CN2021/076922 international search report.

* cited by examiner

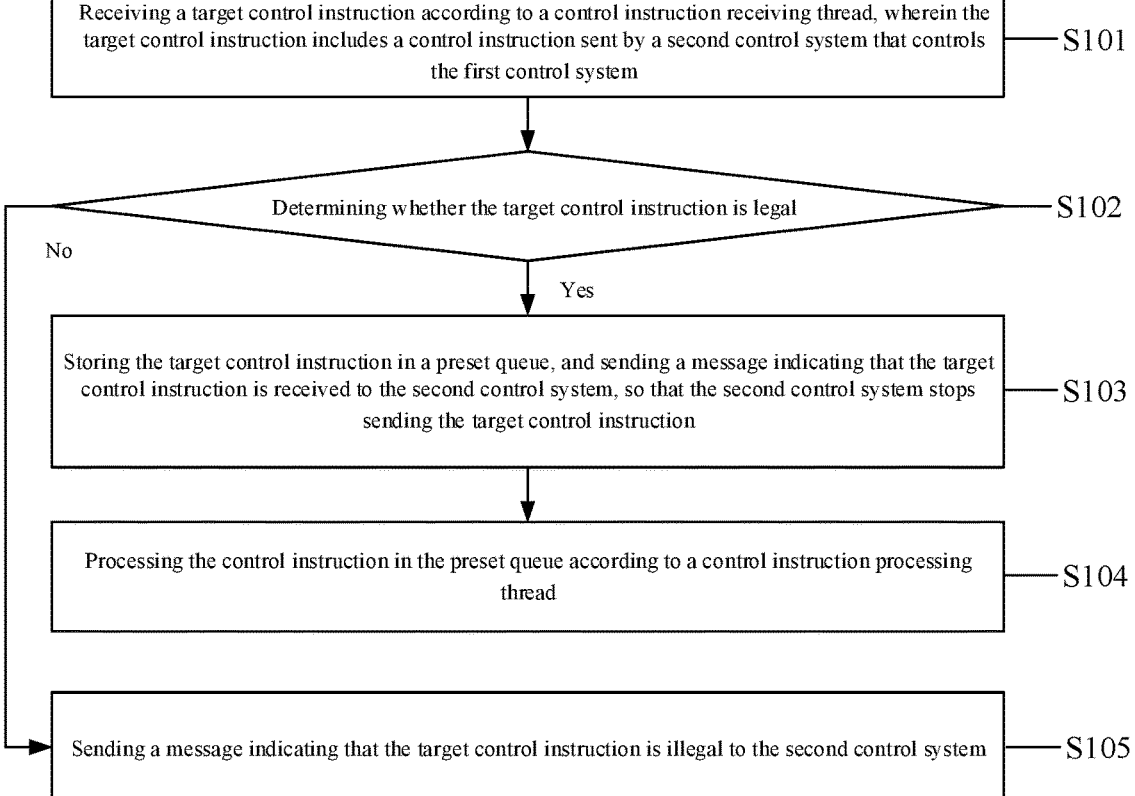

Receiving a target control instruction according to a control instruction receiving thread, wherein the target control instruction includes a control instruction sent by a second control system that controls the first control system —— S101

Determining whether the target control instruction is legal —— S102

No

Yes

Storing the target control instruction in a preset queue, and sending a message indicating that the target control instruction is received to the second control system, so that the second control system stops sending the target control instruction —— S103

Processing the control instruction in the preset queue according to a control instruction processing thread —— S104

Sending a message indicating that the target control instruction is illegal to the second control system —— S105

FIG. 1

CONTROL INSTRUCTION PROCESSING METHOD, APPARATUS AND DEVICE, AND COMPUTER STORAGE MEDIUM

The present disclosure claims the priority of the Chinese patent application filed on Jun. 24, 2020 before the CNIPA, China National Intellectual Property Administration with the application number of 202010589326.8 and the title of "CONTROL INSTRUCTION PROCESSING METHOD, APPARATUS AND DEVICE, AND COMPUTER STORAGE MEDIUM", which is incorporated herein in its entirety by reference.

TECHNICAL FIELD

The present disclosure relates to the technical field of instruction processing and more particularly, to a method, apparatus and device for processing a control instruction, and a computer storage medium.

BACKGROUND

To satisfy diverse control requirements, a controller of a server in practical applications may include a plurality of control systems, for example, an embedded system and a large-scale system running on a server CPU, and the communication between the large-scale system and the embedded system is based on serial data transmission. For instance, the large-scale system issues a control instruction, and then the embedded system receives the instruction, processes a task, and returns a task execution result to the large-scale system after the task processing is completed.

However, in the existing control methods, a large-scale system issues a control instruction, and the embedded system executes the control instruction and then executes a next control instruction, that is, the execution is performed for each single instruction in a time sequence; if the large-scale system issues a large number of control instructions to the embedded system in a short time, the existing control method is not capable, thereby reducing the efficiency of instruction processing.

In summary, how to improve the efficiency of processing a control instruction is an urgent problem to be solved for those skilled in the art at present.

SUMMARY

It is an object of the present disclosure to provide a method for processing a control instruction, which may solve to some extent the technical problem of how to improve the efficiency of processing a control instruction. The present disclosure further provides an apparatus and device for processing a control instruction, and a computer-readable storage medium.

In order to achieve the above objects, the present disclosure provides the following technical solutions:

a method for processing a control instruction, applied to a first control system, including:

receiving a target control instruction according to a control instruction receiving thread, wherein the target control instruction includes a control instruction sent by a second control system that controls the first control system;

determining whether the target control instruction is legal, and when the target control instruction is legal, storing the target control instruction in a preset queue, and sending a message indicating that the target control instruction is received to the second control system, so that the second control system stops sending the target control instruction; and processing the control instruction in the preset queue according to a control instruction processing thread.

In an embodiment of the present disclosure, after processing the control instruction in the preset queue according to a control instruction processing thread, further including:

determining whether a processing query instruction sent by the second control system for querying a target processing result of the target control instruction is received; and when the processing query instruction is received, sending the target processing result to the second control system.

In an embodiment of the present disclosure, sending the target processing result to the second control system includes:

calculating a time interval between receiving the target control instruction and receiving the processing query instruction;

determining whether the time interval is less than a preset instruction processing duration;

when the time interval is greater than or equal to the preset instruction processing duration, acquiring the target processing result, and sending the target processing result to the second control system;

when the time interval is less than the preset instruction processing duration, acquiring the target processing result after waiting for a preset compensation duration, and sending the target processing result to the second control system.

In an embodiment of the present disclosure, before calculating a time interval between receiving the target control instruction and receiving the processing query instruction, further including:

negotiating the preset instruction processing duration with the second control system.

In an embodiment of the present disclosure, further including:

receiving a state query instruction according to the control instruction receiving thread, wherein the state query instruction includes a query instruction sent by the second control system;

acquiring a target query result corresponding to the state query instruction according to the control instruction processing thread; and transmitting the target query result to the second control system according to the control instruction receiving thread.

In an embodiment of the present disclosure, determining whether the target control instruction is legal includes:

determining whether a type of the target control instruction is of a preset instruction type;

when the type of the target control instruction is of the preset instruction type, determining that the target control instruction is legal; and when the type of the target control instruction is not of the preset instruction type, determining that the target control instruction is illegal.

In an embodiment of the present disclosure, determining whether the target control instruction is legal includes:

determining whether a length of the target control instruction complies with a preset length rule;

when the length of the target control instruction complies with the preset length rule, determining that the target control instruction is legal; and when the length of the target control instruction does not comply with the preset length rule, determining that the target control instruction is illegal.

An apparatus for processing a control instruction, applied to a first control system, including:

a first receiving module configured for receiving a target control instruction according to a control instruction receiving thread, wherein the target control instruction includes a control instruction sent by a second control system that controls the first control system;

a first determining module configured for determining whether the target control instruction is legal, and when the target control instruction is legal, storing the target control instruction in a preset queue, and sending a message indicating that the target control instruction is received to the second control system; and a first processing module configured for processing the control instruction in the preset queue according to a control instruction processing thread.

A device for processing a control instruction, including:

a memory for storing a computer program; and a processor for implementing operations of the method for processing a control instruction according to any of the above embodiments.

A computer-readable storage medium, stoting a computer program which, when executed by a processor, performs operations of the method for processing a control instruction according to any of the above embodiments.

The present disclosure provides a method for processing a control instruction, applied to a first control system, including: receiving a target control instruction according to a control instruction receiving thread, wherein the target control instruction includes a control instruction sent by a second control system that controls the first control system; determining whether the target control instruction is legal, and when the target control instruction is legal, storing the target control instruction in a preset queue, and sending a message indicating that the target control instruction is received to the second control system, so that the second control system stops sending the target control instruction; and processing the control instruction in the preset queue according to a control instruction processing thread. In the present disclosure, after determining that the target control instruction is legal, the first control system stores the target control instruction in the preset queue and sends the message indicating that the target control instruction is received to the second control system, so that the second control system stops sending the target control instruction, and the second control system may send a next instruction without waiting for the first control system to complete the processing of the target control instruction, which may avoid the accumulation of control instructions at the second control system and improve the efficiency of the second control system sending control instructions; in addition, in the present disclosure, the first control system employs different threads when receiving the target control instruction and processing the target control instruction, which reduces the coupling degree between instruction receiving and instruction processing, and improves the efficiency of the first control system responding to the control instruction. In summary, the present disclosure may improve the efficiency of processing control instructions. The apparatus and device for processing a control instruction, and the computer-readable storage medium also solve the corresponding technical problems.

BRIEF DESCRIPTION OF THE DRAWINGS

In order to more clearly explain the embodiments of the present application or the technical solutions in the prior art, the following will briefly introduce the drawings needed to be used in the embodiments or the prior technical description. Obviously, the drawings in the following description are only some embodiments of the present application. For ordinary technicians in the field, they may also obtain other embodiments according to these drawings without paying creative labor.

FIG. 1 is a first flow chart of a method for processing a control instruction according to an embodiment of the present disclosure;

DETAILED DESCRIPTION OF THE EMBODIMENTS

Figures 2, 3, 4:
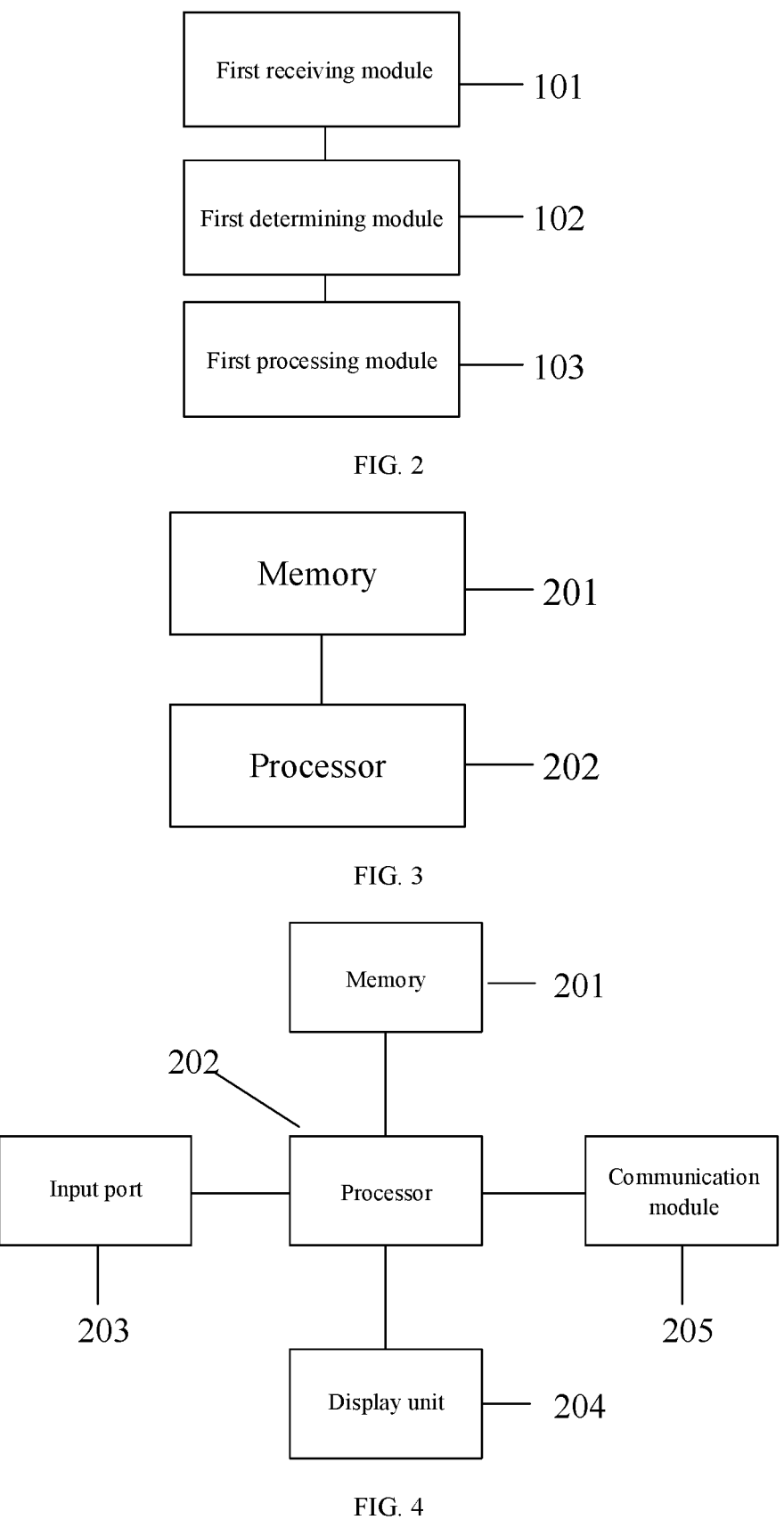
FIG. 2 is a schematic diagram showing a configuration of an apparatus for processing a control instruction according to an embodiment of the present disclosure.
FIG. 3 is a schematic diagram showing a configuration of a device for processing a control instruction according to an embodiment of the present disclosure.
FIG. 4 is another schematic diagram showing a configuration of the device for processing a control instruction according to an embodiment of the present disclosure.

In combination with the drawings in the embodiments of the present disclosure, the technical solutions in the embodiments of the present disclosure will be described clearly and completely. Obviously, the described embodiments are only part of the embodiments of the present disclosure, not all of them. Based on the embodiments of the present disclosure, all other embodiments obtained by ordinary technicians in the art without creative work belong to the scope of the present disclosure.

Reference is now made to FIG. 1, which is a first flow chart of a method for processing a control instruction according to an embodiment of the present disclosure.

An embodiment of the present disclosure provides a method for processing a control instruction, which is applied to a first control system and may include the following operations.

In step S101, receiving a target control instruction according to a control instruction receiving thread, wherein the target control instruction includes a control instruction sent by a second control system that controls the first control system.

In practical applications, the first control system may first receive the target control instruction according to the control instruction receiving thread, and the target control instruction includes the control instruction sent by the second control system controlling the first control system, that is, the second control system sends a corresponding target control instruction to the first control system; and the first control system receives the target control instruction through a control instruction receiving thread thereof.

It should be noted that the types of the first control system, the second control system, and the target control instruction may be determined according to actual needs.

In step S102, determining whether the target control instruction is legal, and when the target control instruction is legal, the process goes to step S103; when the target control command is illegal, the process goes to step S105.

In step S103, storing the target control instruction in a preset queue, and sending a message indicating that the target control instruction is received to the second control system, so that the second control system stops sending the target control instruction, and the process goes to step S104.

In practical applications, to avoid the control instruction issued by the second control system threatening the security of the first control system and the like, after receiving the target control instruction according to the control instruction receiving thread, the first control system may first determine whether the target control instruction is legal. When the target control instruction is legal, the first control system continues to process the target control instruction, that is, the first control system stores the target control instruction in the preset queue, and sends the message indicating that the target control instruction is received to the second control system, so that the second control system stops sending the target control instruction.

It should be noted that since the preset queue stores the target control instruction, the preset queue is equivalent to caching the control instruction to be processed by the first control system, and thus the first control system does not need to execute the target control instruction immediately; moreover, in the present disclosure, after receiving the target control instruction, the first control system sends the message indicating that the target control instruction is received to the second control system, so that the second control system stops sending the target control instruction, that is, the first control system may prompt the second control system to stop sending the target control instruction without processing the target control instruction, so that the second control system may stops sending the target control instruction in advance and continues to issue a next control instruction, avoiding the accumulation of control instructions at the second control system side. However, in the prior art, the second control system needs to wait for the first control system to complete the processing of the target control instruction, and will not issue the next control instruction until receiving the processing result, which leads to the accumulation of control instructions at the second control system side. Therefore, compared with the prior art, the present disclosure improves the efficiency of the second control system sending control instructions.

In step S104, processing the control instruction in the preset queue according to a control instruction processing thread.

In practical applications, the first control system processes the control instructions in the preset queue according to the control instruction processing thread to respond to the target control instruction.

It should be noted that in a specific application scenario, when the first control system processes the control instructions in the preset queue through the control instruction processing thread, the control instructions in the preset queue may be processed in the order of reception, the control instructions in the preset queue may also be processed according to the degree of importance, or the like; in addition, in the present disclosure, the control instruction processing thread and the control instruction receiving thread are two different threads, which decouples the receiving and processing functions of the first control system side and improves the efficiency of the first control system processing the control instruction.

In step S105, sending a message indicating that the target control instruction is illegal to the second control system.

In practical applications, after the first control system determines that the target control instruction is illegal, the message indicating that the target control instruction is illegal may be sent to the second control system, so that the second control system learns that the target control instruction is illegal; apparently, there may also be other operation modes, and the present disclosure is not limiting in this regard.

The present disclosure provides a method for processing a control instruction, applied to a first control system, including: receiving a target control instruction according to a control instruction receiving thread, wherein the target control instruction includes a control instruction sent by a second control system that controls the first control system; determining whether the target control instruction is legal, and when the target control instruction is legal, storing the target control instruction in a preset queue, and sending a message indicating that the target control instruction is received to the second control system, so that the second control system stops sending the target control instruction; and processing the control instruction in the preset queue according to a control instruction processing thread. In the present disclosure, after determining that the target control instruction is legal, the first control system stores the target control instruction in the preset queue and sends the message indicating that the target control instruction is received to the second control system, so that the second control system stops sending the target control instruction, and the second control system may send a next instruction without waiting for the first control system to complete the processing of the target control instruction, which may avoid the accumulation of control instructions at the second control system and improve the efficiency of the second control system sending control instructions; in addition, in the present disclosure, the first control system employs different threads when receiving the target control instruction and processing the target control instruction, which reduces the coupling degree between instruction receiving and instruction processing, and improves the efficiency of the first control system responding to the control instruction. In summary, the present disclosure may improve the efficiency of processing control instructions.

According to the method for processing a control instruction provided by the embodiment of the present disclosure, since the first control system sends the message indicating that the target control instruction is received to the second control system after receiving the target control instruction so that the second control system stops sending the target control instruction, the first control system does not send the target processing result of the target control instruction to the second control system; for the second control system to learn the target processing result, after processing the control instruction in the preset queue according to the control instruction processing thread, the first control system may further determine whether a processing query instruction sent by the second control system for querying the target processing result of the target control instruction is received, and when the processing query instruction is received, the first control system sends the target processing result to the second control system.

In practical applications, since the control instruction is stored in the preset queue, as time goes by, a plurality of control instructions may be stored in the preset queue, and the first control system consumes more time to process all the control instructions, that is, the first control system consumes more time to obtain the target processing result; to ensure that the first control system successfully feeds back the target processing result to the second control system, after the first control system sends the target processing result to the second control system, the first control system may further: calculate a time interval between receiving the target control instruction and receiving the processing query instruction; determine whether the time interval is less than a preset instruction processing duration; when the time interval is greater than or equal to the preset instruction processing duration, acquire the target processing result, and send the target processing result to the second control system; when the time interval is less than the preset instruction processing duration, acquire the target processing result after waiting for a preset compensation duration, and send the target processing result to the second control system.

It should be noted that the preset instruction processing duration may be agreed in advance by the first control system and the second control system, that is, the first control system may also negotiate the preset instruction processing duration with the second control system before calculating the time interval between receiving the target control instruction and receiving the query instruction. Apparently, the preset instruction processing duration may also be directly set by the first control system in real time according to the instruction processing capability thereof, and the like.

According to the method for processing a control instruction provided in the embodiment of the present disclosure, besides sending the control instruction to the first control system, the second control system may further send an instruction for querying corresponding state information, for example, querying parameters of state information such as a voltage parameter, a temperature parameter, and a fan parameter; to meet the query need of the second control system and avoid the conflict between the state query need and the control instruction processing need, after receiving a state query instruction according to the control instruction receiving thread, where the state query instruction includes the query instruction sent by the second control system, the first control system may acquire a target query result corresponding to the state query instruction according to the control instruction processing thread, and transmit the target query result to the second control system according to the control instruction receiving thread.

According to the method for processing a control instruction provided in the embodiment of the present disclosure, since the type of the control instruction between the first control system and the second control system may be determined in advance, the first control system may determine whether the instruction is legal according to the type of the instruction, that is, in the process of determining whether the target control instruction is legal, the first control system may determine whether a type of the target control instruction is of a preset instruction type; when the type of the target control instruction is of the preset instruction type, the first control system determines that the target control instruction is legal; when the type of the target control instruction is not of the preset instruction type, the first control system determines that the target control instruction is illegal.

In practical applications, since a length of each type of instruction is under a certain rule, the first control system may determine whether the instruction is legal according to the length of the instruction, that is, in the process of determining whether the target control instruction is legal, the first control system may further determine whether the length of the target control instruction complies with a preset length rule; when the length of the target control instruction complies with the preset length rule, the first control system determines that the target control instruction is legal; when the length of the target control instruction does not comply with the preset length rule, the first control system determines that the target control instruction is illegal.

Reference is made to FIG. 2, a schematic diagram showing a configuration of an apparatus for processing a control instruction according to an embodiment of the present disclosure.

An embodiment of the present disclosure provides an apparatus for processing a control instruction, applied to a first control system, including:

a first receiving module 101 for receiving a target control instruction according to a control instruction receiving thread, wherein the target control instruction includes a control instruction sent by a second control system that controls the first control system;

a first determining module 102 for determining whether the target control instruction is legal, and when the target control instruction is legal, storing the target control instruction in a preset queue, and sending a message indicating that the target control instruction is received to the second control system; and a first processing module 103 for processing the control instruction in the preset queue according to a control instruction processing thread.

An embodiment of the present disclosure provides an apparatus for processing a control instruction, applied to a first control system, further including:

a second determining module for determining, after the first processing module processes the control instruction in the preset queue according to the control instruction processing thread, whether a processing query instruction sent by the second control system for querying the target processing result of the target control instruction is received, and when the processing query instruction is received, sending the target processing result to the second control system.

An embodiment of the present disclosure provides an apparatus for processing a control instruction, applied to the first control system, where the second determining module may include:

a first calculating unit for calculating a time interval between receiving the target control instruction and receiving the processing query instruction; and a first determining unit for determining whether the time interval is less than a preset instruction processing duration; when the time interval is greater than or equal to the preset instruction processing duration, acquiring the target processing result, and sending the target processing result to the second control system; when the time interval is less than the preset instruction processing duration, acquiring the target processing result after waiting for a preset compensation duration, and sending the target processing result to the second control system.

An embodiment of the present disclosure provides an apparatus for processing a control instruction, applied to the first control system, further including:

a first negotiating unit for negotiating the preset instruction processing duration with the second control system before the first calculating unit calculates the time interval between receiving the target control instruction and receiving the query instruction.

An embodiment of the present disclosure provides an apparatus for processing a control instruction, applied to the first control system, further including:

a second receiving module for receiving a state query instruction according to the control instruction receiving thread, where the state query instruction includes a query instruction sent by the second control system;

a first query module for acquiring a target query result corresponding to the state query instruction according to the control instruction processing thread; and a first sending module for transmitting the target query result to the second control system according to the control instruction receiving thread.

An embodiment of the present disclosure provides an apparatus for processing a control instruction, applied to the first control system, where the first determining module may include:

a second determining unit for determining whether a type of the target control instruction is of a preset instruction type; when the type of the target control instruction is of the preset instruction type, determining that the target control instruction is legal; and when the type of the target control instruction is not of the preset instruction type, determining that the target control instruction is illegal.

The embodiment of the present disclosure provides an apparatus for processing a control instruction, applied to the first control system, where the first determining module may include:

a third determining unit for determining whether a length of the target control instruction complies with a preset length rule; when the length of the target control instruction complies with the preset length rule, determining that the target control instruction is legal; and when the length of the target control instruction does not comply with the preset length rule, determining that the target control instruction is illegal.

The present disclosure also provides a device for processing a control instruction and a computer-readable storage medium, which both have the corresponding effects of the method for processing a control instruction provided by the embodiment of the present disclosure. Reference is made to FIG. 3, a schematic diagram showing a configuration of a device for processing a control instruction according to an embodiment of the present disclosure.

An embodiment of the present disclosure provides a device for processing a control instruction, applied to the first control system, including a memory 201 and a processor 202, where the memory 201 stores a computer program, and the processor 202, when executing the computer program, implements operations of:

receiving a target control instruction according to a control instruction receiving thread, where the target control instruction includes a control instruction sent by a second control system that controls the first control system;

determining whether the target control instruction is legal, and when the target control instruction is legal, storing the target control instruction in a preset queue, and sending a message indicating that the target control instruction is received to the second control system, so that the second control system stops sending the target control instruction; and processing the control instruction in the preset queue according to a control instruction processing thread.

An embodiment of the present disclosure provides a device for processing a control instruction, applied to the first control system, including a memory 201 and a processor 202, where the memory 201 stores a computer program, and the processor 202, when executing the computer program, implements operations of: determining, after the first processing module processes the control instruction in the preset queue according to the control instruction processing thread, whether a processing query instruction sent by the second control system for querying the target processing result of the target control instruction is received, and when the processing query instruction is received, sending the target processing result to the second control system.

An embodiment of the present disclosure provides a device for processing a control instruction, applied to the first control system, including a memory 201 and a processor 202, where the memory 201 stores a computer program, and the processor 202, when executing the computer program, implements operations of: calculating a time interval between receiving the target control instruction and receiving the processing query instruction; determining whether the time interval is less than a preset instruction processing duration; when the time interval is greater than or equal to the preset instruction processing duration, acquiring the target processing result, and send the target processing result to the second control system; when the time interval is less than the preset instruction processing duration, acquiring the target processing result after waiting for a preset compensation duration, and sending the target processing result to the second control system.

An embodiment of the present disclosure provides a device for processing a control instruction, applied to the first control system, including a memory 201 and a processor 202, where the memory 201 stores a computer program, and the processor 202, when executing the computer program, implements the operation of: negotiating the preset instruction processing duration with the second control system before calculating the time interval between receiving the target control instruction and receiving the query instruction.

An embodiment of the present disclosure provides a device for processing a control instruction, applied to the first control system, including a memory 201 and a processor 202, where the memory 201 stores a computer program, and the processor 202, when executing the computer program, implements operations of: receiving a state query instruction according to the control instruction receiving thread, where the state query instruction includes a query instruction sent by the second control system; acquiring a target query result corresponding to the state query instruction according to the control instruction processing thread; and transmitting the target query result to the second control system according to the control instruction receiving thread.

An embodiment of the present disclosure provides a device for processing a control instruction, applied to the first control system, including a memory 201 and a processor 202, where the memory 201 stores a computer program, and the processor 202, when executing the computer program, implements operations of: determining whether the target control instruction is of a preset instruction type; when the target control instruction is of the preset instruction type, determining that the target control instruction is legal; and when the target control instruction is not of the preset instruction type, determining that the target control instruction is illegal.

An embodiment of the present disclosure provides a device for processing a control instruction, applied to the first control system, including a memory 201 and a processor 202, where the memory 201 stores a computer program, and the processor 202, when executing the computer program, implements operations of: determining whether a length of the target control instruction complies with a preset length rule; when the length of the target control instruction complies with the preset length rule, determining that the target control instruction is legal; and when the length of the target control instruction does not comply with the preset length rule, determining that the target control instruction is illegal.

With reference to FIG. 4, another device for processing a control instruction provided by an embodiment of the present application may further include: an input port 203 connected to the processor 202 for transmitting an external input instruction to the processor 202; a display unit 204 connected to the processor 202 for displaying a processing result of the processor 202 to an outsider; a communication module 205 connected to the processor 202 for enabling the device for processing a control instruction to communicate with the outsider. The display unit 204 may be a display panel, a laser scanning display, and the like; the communication modes adopted by the communication module 205 include, but are not limited to, mobile high definition link technology (HML), universal serial bus (USB), high definition multimedia interface (HDMI) and wireless connection such as Wireless Fidelity (Wi-Fi), Bluetooth, Low-power Bluetooth, and IEEE802.11s-based communication technology.

An embodiment of the present disclosure provides a computer-readable storage medium, applied to the first control system, where a computer program is stored in the computer-readable storage medium and, when executed by a processor, implements the operations of:

receiving a target control instruction according to a control instruction receiving thread, where the target control instruction includes a control instruction sent by a second control system that controls the first control system;

determining whether the target control instruction is legal, and when the target control instruction is legal, storing the target control instruction in a preset queue, and sending a message indicating that the target control instruction is received to the second control system, so that the second control system stops sending the target control instruction; and processing the control instruction in the preset queue according to a control instruction processing thread.

An embodiment of the present disclosure provides a computer-readable storage medium, applied to the first control system, where a computer program is stored in the computer-readable storage medium and, when executed by a processor, implements the operations of: determining, after the first processing module processes the control instruction in the preset queue according to the control instruction processing thread, whether a processing query instruction sent by the second control system for querying the target processing result of the target control instruction is received, and when the processing query instruction is received, sending the target processing result to the second control system.

An embodiment of the present disclosure provides a computer-readable storage medium, applied to the first control system, where a computer program is stored in the computer-readable storage medium and, when executed by a processor, implements the operations of: calculating a time interval between receiving the target control instruction and receiving the processing query instruction; determining whether the time interval is less than a preset instruction processing duration; when the time interval is greater than or equal to the preset instruction processing duration, acquiring the target processing result, and send the target processing result to the second control system; when the time interval is less than the preset instruction processing duration, acquiring the target processing result after waiting for a preset compensation duration, and sending the target processing result to the second control system.

An embodiment of the present disclosure provides a computer-readable storage medium, applied to the first control system, where a computer program is stored in the computer-readable storage medium and, when executed by a processor, implements the operation of: negotiating the preset instruction processing duration with the second control system before calculating the time interval between receiving the target control instruction and receiving the query instruction.

An embodiment of the present disclosure provides a computer-readable storage medium, applied to the first control system, where a computer program is stored in the computer-readable storage medium and, when executed by a processor, implements the operations of: receiving a state query instruction according to the control instruction receiving thread, where the state query instruction includes a query instruction sent by the second control system; acquiring a target query result corresponding to the state query instruction according to the control instruction processing thread; and transmitting the target query result to the second control system according to the control instruction receiving thread.

An embodiment of the present disclosure provides a computer-readable storage medium, applied to the first control system, where a computer program is stored in the computer-readable storage medium and, when executed by a processor, implements the operations of: determining whether the target control instruction is of a preset instruction type; when the target control instruction is of the preset instruction type, determining that the target control instruction is legal; and when the target control instruction is not of the preset instruction type, determining that the target control instruction is illegal.

An embodiment of the present disclosure provides a computer-readable storage medium, applied to the first control system, where a computer program is stored in the computer-readable storage medium and, when executed by a processor, implements the operations of: determining whether a length of the target control instruction complies with a preset length rule; when the length of the target control instruction complies with the preset length rule, determining that the target control instruction is legal; and when the length of the target control instruction does not comply with the preset length rule, determining that the target control instruction is illegal.

The computer-readable storage medium referred to herein may be a RAM, a memory, a ROM, an electrically programmable ROM, an electrically erasable programmable ROM, a register, a hard disk, a removable disk, a CD-ROM, or any other form of storage medium known in the art.

Reference may be made to the detailed description of corresponding parts of the method for processing a control instruction provided in the embodiment of the present disclosure to understand relevant parts of the apparatus and device for processing a control instruction, and the computer-readable storage medium provided herein, which will not be repeated here. In addition, in the above-mentioned technical solutions provided herein, those identical to the mechanisms of corresponding technical solutions in the prior art are not described in detail for brevity.

It should also be noted that, in this paper, relational terms such as the first and second are only used to distinguish one entity or operation from another entity or operation, and do not necessarily require or imply any such actual relationship or order between these entities or operations. Moreover, the terms "including", "comprising" or any other variant thereof are intended to cover non-exclusive inclusion, so that a process, method, article or equipment including a series of elements not only includes those elements, but also includes other elements not explicitly listed, or also includes elements inherent to such process, method, article or equipment. Without further restrictions, the elements defined by the statement "including one . . . " do not exclude that there are other identical elements in the process, method, article or equipment including the elements.

The above description of the disclosed embodiments enables those skilled in the art to realize or use the application. A variety of modifications to these embodiments will be apparent to those skilled in the art. The general principles defined herein may be implemented in other embodiments without departing from the spirit or scope of the application. Therefore, the present application will not be limited to these embodiments shown herein, but will conform to the widest scope consistent with the principles and novel features disclosed herein.

The invention claimed is:

1. A method for processing a control instruction, applied to a server, wherein a controller of the server comprises a first control system and a second control system, the first control system is an embedded system, the second control system is a system running on a server central processing unit, and the method comprises:

receiving, by the first control system, a target control instruction according to a control instruction receiving thread, wherein the target control instruction comprises a control instruction sent by a second control system that controls the first control system;

determining, by the first control system, whether the target control instruction is legal, and when the target control instruction is legal, storing the target control instruction in a preset queue, and sending a message indicating that the target control instruction is received to the second control system, so that the second control system stops sending the target control instruction; and processing, by the first control system, the target control instruction in the preset queue according to a control instruction processing thread;

wherein after processing the target control instruction in the preset queue according to a control instruction processing thread, the method further comprises:

determining whether a processing query instruction sent by the second control system for querying a target processing result of the target control instruction is received; and when the processing query instruction is received, sending the target processing result to the second control system; and wherein sending the target processing result to the second control system comprise:

calculating a time interval between receiving the target control instruction and receiving the processing query instruction;

determining whether the time interval is less than a preset instruction processing duration;

when the time interval is greater than or equal to the preset instruction processing duration, acquiring the target processing result, and sending the target processing result to the second control system; and when the time interval is less than the preset instruction processing duration, acquiring the target processing result after waiting for a preset compensation duration, and sending the target processing result to the second control system.

2. The method according to claim 1, before calculating a time interval between receiving the target control instruction and receiving the processing query instruction, further comprising:

negotiating the preset instruction processing duration with the second control system.

3. The method according to claim 1, further comprising:

receiving a state query instruction according to the control instruction receiving thread, wherein the state query instruction comprises a query instruction sent by the second control system;

acquiring a target query result corresponding to the state query instruction according to the control instruction processing thread; and transmitting the target query result to the second control system according to the control instruction receiving thread.

4. The method according to claim 3, wherein determining whether the target control instruction is legal comprises:

determining whether a type of the target control instruction is of a preset instruction type;

when the type of the target control instruction is of the preset instruction type, determining that the target control instruction is legal; and when the type of the target control instruction is not of the preset instruction type, determining that the target control instruction is illegal.

5. The method according to claim 3, wherein determining whether the target control instruction is legal comprises:

determining whether a length of the target control instruction complies with a preset length rule;

when the length of the target control instruction complies with the preset length rule, determining that the target control instruction is legal; and when the length of the target control instruction does not comply with the preset length rule, determining that the target control instruction is illegal.

6. A device for processing a control instruction, comprising:

a memory storing a computer program; and a processor, when executing the computer program, performing operations comprising:

receiving a target control instruction according to a control instruction receiving thread, wherein the target control instruction comprises a control instruction sent by a second control system that controls the first control system, and the first control system is an embedded system and the second control system is a system running on a server central processing unit;

determining whether the target control instruction is legal, and when the target control instruction is legal, storing the target control instruction in a preset queue, and sending a message indicating that the target control instruction is received to the second control system, so that the second control system stops sending the target control instruction; and processing the target control instruction in the preset queue according to a control instruction processing thread;

wherein after the operation of processing the target control instruction in the preset queue according to a control instruction processing thread, the processor performing operations further comprises:

determining whether a processing query instruction sent by the second control system for querying a target processing result of the target control instruction is received; and when the processing query instruction is received, sending the target processing result to the second control system; and wherein the operation of sending the target processing result to the second control system comprises:

calculating a time interval between receiving the target control instruction and receiving the processing query instruction;

determining whether the time interval is less than a preset instruction processing duration;

when the time interval is greater than or equal to the preset instruction processing duration, acquiring the target processing result, and sending the target processing result to the second control system; and when the time interval is less than the preset instruction processing duration, acquiring the target processing result after waiting for a preset compensation duration, and sending the target processing result to the second control system.

7. A non-transitory computer-readable storage medium, storing a computer program which, when executed by a processor, performs operations comprising:

receiving a target control instruction according to a control instruction receiving thread, wherein the target control instruction comprises a control instruction sent by a second control system that controls the first control system, and the first control system is an embedded system and the second control system is a system running on a server central processing unit;

determining whether the target control instruction is legal, and when the target control instruction is legal, storing the target control instruction in a preset queue, and sending a message indicating that the target control instruction is received to the second control system, so that the second control system stops sending the target control instruction; and processing the target control instruction in the preset queue according to a control instruction processing thread;

wherein after the operation of processing the target control instruction in the preset queue according to a control instruction processing thread, the operations further comprise:

determining whether a processing query instruction sent by the second control system for querying a target processing result of the target control instruction is received; and when the processing query instruction is received, sending the target processing result to the second control system; and wherein the operation of sending the target processing result to the second control system comprises:

calculating a time interval between receiving the target control instruction and receiving the processing query instruction;

determining whether the time interval is less than a preset instruction processing duration;

when the time interval is greater than or equal to the preset instruction processing duration, acquiring the target processing result, and sending the target processing result to the second control system; and when the time interval is less than the preset instruction processing duration, acquiring the target processing result after waiting for a preset compensation duration, and sending the target processing result to the second control system.

8. The device for processing a control instruction according to claim 6, wherein before the operation of calculating a time interval between receiving the target control instruction and receiving the processing query instruction, the processor performing operations further comprises:

negotiating the preset instruction processing duration with the second control system.

9. The device for processing a control instruction according to claim 6, wherein the processor performing operations further comprises:

receiving a state query instruction according to the control instruction receiving thread, wherein the state query instruction comprises a query instruction sent by the second control system;

acquiring a target query result corresponding to the state query instruction according to the control instruction processing thread; and transmitting the target query result to the second control system according to the control instruction receiving thread.

10. The device for processing a control instruction according to claim 9, wherein the operation of determining whether the target control instruction is legal comprises:

determining whether a type of the target control instruction is of a preset instruction type;

when the type of the target control instruction is of the preset instruction type, determining that the target control instruction is legal; and when the type of the target control instruction is not of the preset instruction type, determining that the target control instruction is illegal.

11. The device for processing a control instruction according to claim 9, wherein the operation of determining whether the target control instruction is legal comprises:

determining whether a length of the target control instruction complies with a preset length rule;

when the length of the target control instruction complies with the preset length rule, determining that the target control instruction is legal; and when the length of the target control instruction does not comply with the preset length rule, determining that the target control instruction is illegal.

12. The non-transitory computer-readable storage medium according to claim 7, wherein before the operation of calculating a time interval between receiving the target control instruction and receiving the processing query instruction, the operations further comprise:

negotiating the preset instruction processing duration with the second control system.

13. The non-transitory computer-readable storage medium according to claim 7, wherein the operations further comprise:

receiving a state query instruction according to the control instruction receiving thread, wherein the state query instruction comprises a query instruction sent by the second control system;

acquiring a target query result corresponding to the state query instruction according to the control instruction processing thread; and transmitting the target query result to the second control system according to the control instruction receiving thread.

14. The non-transitory computer-readable storage medium according to claim 13, wherein the operation of determining whether the target control instruction is legal comprises:

determining whether a type of the target control instruction is of a preset instruction type;

when the type of the target control instruction is of the preset instruction type, determining that the target control instruction is legal; and when the type of the target control instruction is not of the preset instruction type, determining that the target control instruction is illegal.

\* \* \* \* \*